United States Patent
Lee et al.

(10) Patent No.: US 8,238,464 B2
(45) Date of Patent: Aug. 7, 2012

(54) METHOD AND APPARATUS FOR DECOMPOSING CHANNEL IN CLOSED-LOOP MULTIPLE INPUT MULTIPLE OUTPUT COMMUNICATION SYSTEM

(75) Inventors: Kyoung-Jae Lee, Seoul (KR); In-Kyu Lee, Seoul (KR)

(73) Assignees: Samsung Electronics Co., Ltd., Suwon-si (KR); Seoul National University Industry Foundation, Seoul (KR)

( * ) Notice: Subject to any disclaimer, the term of this patent is extended or adjusted under 35 U.S.C. 154(b) by 825 days.

(21) Appl. No.: 12/291,286

(22) Filed: Nov. 7, 2008

(65) Prior Publication Data

US 2009/0122889 A1     May 14, 2009

(30) Foreign Application Priority Data

Nov. 9, 2007   (KR) ................ 10-2007-0114286

(51) Int. Cl.
*H04B 7/02*    (2006.01)

(52) U.S. Cl. .............. 375/267; 375/285; 375/220
(58) Field of Classification Search .......... 375/295–315, 375/324
See application file for complete search history.

(56) References Cited

U.S. PATENT DOCUMENTS

| 7,711,066 B2* | 5/2010 | Jiang et al. ............ 375/296 |
| 2007/0258536 A1* | 11/2007 | Kim et al. ............ 375/267 |
| 2008/0043873 A1 | 2/2008 | Ariyavisitakul |

FOREIGN PATENT DOCUMENTS

WO   WO 2006052890 A1 *  5/2006

* cited by examiner

*Primary Examiner* — Chieh M Fan
*Assistant Examiner* — Janice Tieu

(57) ABSTRACT

An apparatus for decomposing a channel in a closed-loop Multiple Input Multiple Output (MIMO) communication system is provided. The channel decomposition apparatus includes a transmitter for precoding input symbols using a first matrix which is a product of a unitary matrix V, a diagonal matrix $\Phi$ and a blockwise Uniform Channel Decomposition (UCD) matrix $P_{BL}$, before outputting the input symbols.

17 Claims, 5 Drawing Sheets

METHOD AND APPARATUS FOR DECOMPOSING CHANNEL IN CLOSED-LOOP MULTIPLE INPUT MULTIPLE OUTPUT COMMUNICATION SYSTEM

CROSS-REFERENCE TO RELATED APPLICATION(S) AND CLAIM OF PRIORITY

The present application claims the benefit under 35 U.S.C. §119(a) of a Korean Patent Application filed in the Korean Intellectual Property Office on Nov. 9, 2007 and assigned Serial No. 2007-114286, the disclosures of which are incorporated herein by reference.

TECHNICAL FIELD OF THE INVENTION

The present invention relates to a method and apparatus for decomposing all channels into independent subchannels in a closed-loop Multiple Input Multiple Output (MIMO) communication system.

BACKGROUND OF THE INVENTION

In communication systems, various schemes for acquiring high performance gain are being studied, and their typical examples include an open-loop scheme, a closed-loop scheme, a multi-antenna scheme, and a closed-loop multi-antenna scheme.

For example, compared with the open-loop system in which only the receiver can use channel information, the closed-loop system in which both the transmitter and the receiver can use channel information can have a higher performance gain.

In addition, the use of multiple antennas can also provide greater performance gain. The multi-antenna system is roughly classified into a method for obtaining diversity gain to decrease a transmission error rate and a multiplexing method for simultaneously transmitting many symbols to increase a data rate.

Based on these methods, in order to secure higher system performance, research is being conducted on a closed-loop multi-antenna technology capable of obtaining both diversity gain and multiplexing gain by using multiple antennas for the closed-loop system in which the transmitter can acquire channel information.

The typical closed-loop multi-antenna technology includes a Singular Value Decomposition (SVD) technique and a Uniform Channel Decomposition (UCD) technique. The SVD technique decomposes all channels for multiple antennas into independent subchannels, so the independent subchannels have various Signal-to-Noise Ratios (SNRs). However, in the SVD technique, low-SNR subchannels suffer performance reduction, causing an increase in the performance imbalance of the entire system.

In order to solve the problems of the SVD technique, the UCD technique was developed. The UCD technique achieves the same subchannel SNR for each subcarrier by applying a Successive Interference Cancellation (SIC) method to the receiver. Thus, compared with the SVD technique, the UCD technique noticeably improves error performance when there is no channel coding.

On the other hand, during channel coding, the UCD technique may undergo abrupt performance reduction due to an error transfer phenomenon that inevitably occurs with the SIC method used by the receiver.

SUMMARY OF THE INVENTION

To address the above-discussed deficiencies of the prior art, it is a primary aspect of the present invention to address at least the problems and/or disadvantages and to provide at least the advantages described below. Accordingly, an aspect of the present invention is to provide a blockwise transmission precoder for increasing the performance reduced due to an error transfer phenomenon of UCD by using a structure of the optimal Maximum Likelihood (ML) receiver which is free from the error transfer phenomenon.

Another aspect of the present invention is to provide a method and apparatus for enabling simple symbol-by-symbol detection at a receiver by means of a transmission precoder, and also acquiring optimal performance of a multi-antenna system.

According to one aspect of the present invention, there is provided an apparatus for decomposing a channel in a closed-loop Multiple Input Multiple Output (MIMO) communication system. The apparatus includes a transmitter for precoding input symbols using a first matrix which is a product of a unitary matrix V, a diagonal matrix $\Phi$ and a blockwise Uniform Channel Decomposition (UCD) matrix $P_{BL}$, before outputting the input symbols.

According to one aspect of the present invention, there is provided a method for decomposing a channel in a closed-loop Multiple Input Multiple Output (MIMO) communication system. The method includes precoding input symbols using a first matrix which is a product of a unitary matrix V, a diagonal matrix $\Phi$ and a blockwise Uniform Channel Decomposition (UCD) matrix $P_{BL}$, before outputting the input symbols.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1A through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication system.

Figure 1A:
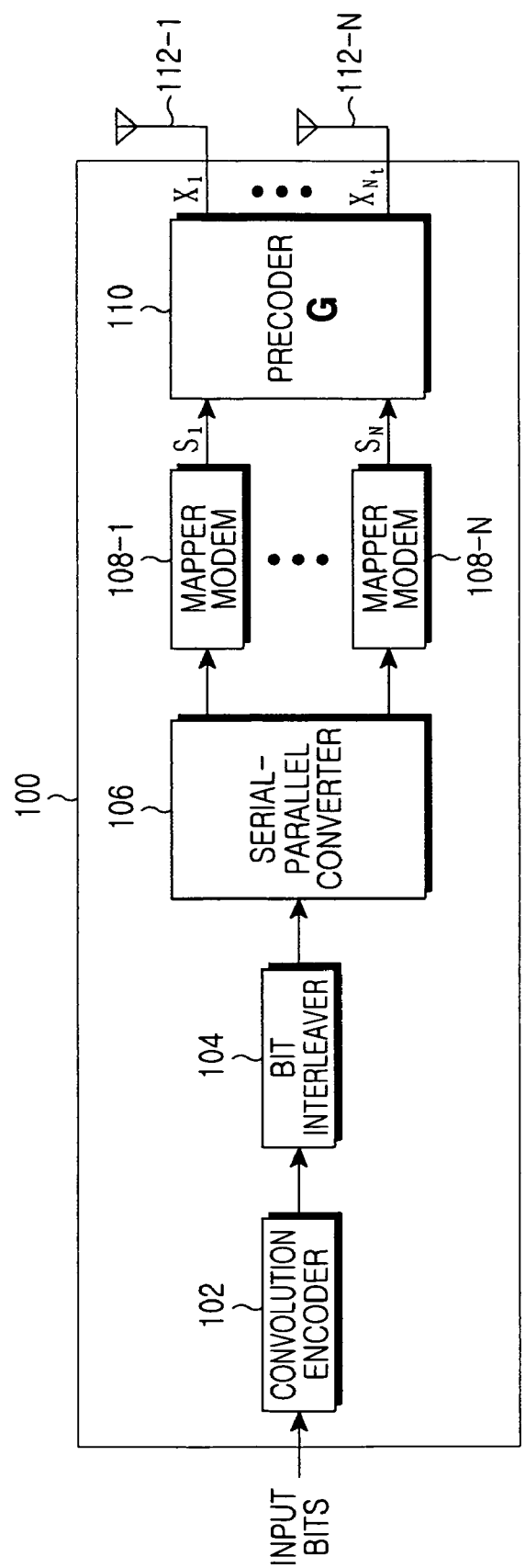
FIGS. 1A and 1B are diagrams illustrating structures of a transmitter and a receiver according to an embodiment of the present invention.
Figure 1B:
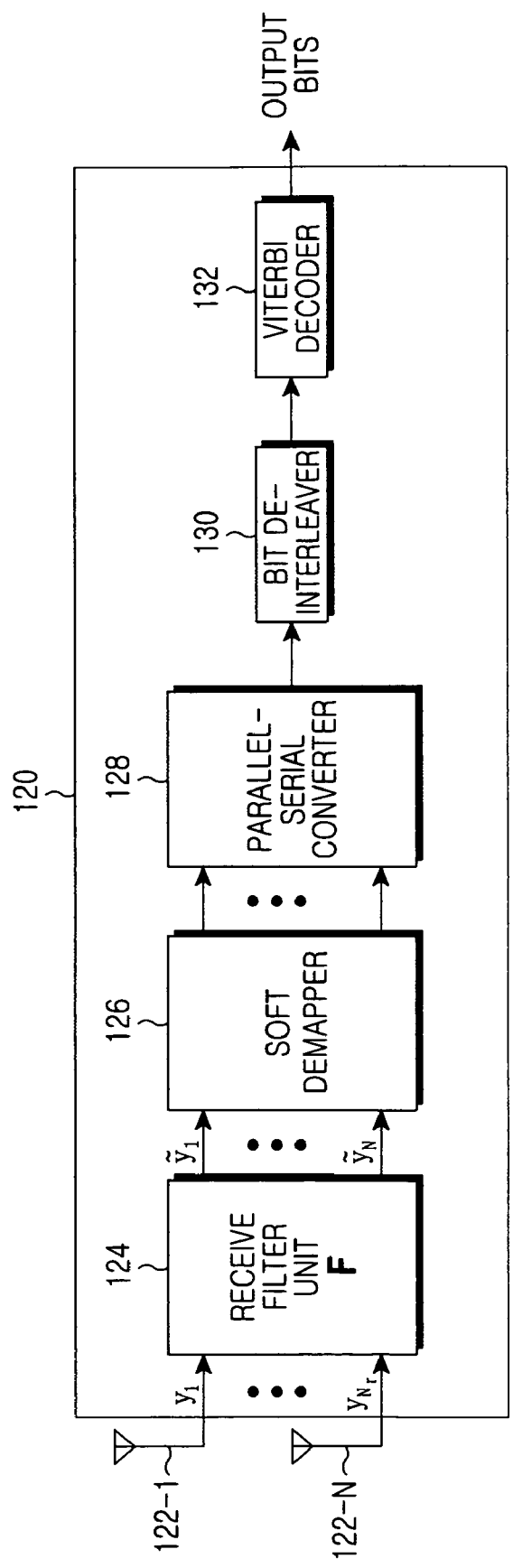

FIGS. 1A and 1B are diagrams illustrating structures of a transmitter and a receiver according to an embodiment of the present invention. Herein, a closed-loop system between a transmitter 100 having $N_t$ transmit antennas and a receiver 120 having $N_r$ receive antennas is considered, and the transmitter 100 and the receiver 120 are assumed to acquire perfect channel state information of each other.

Referring to FIG. 1A, the transmitter 100 includes a convolution encoder 102, a bit interleaver 104, a serial-parallel converter 106, mapper modems 108-1~108-N, a precoder 110, and transmit antennas 112-1~112-N.

Input bits are subjected to Bit Interleaved Coded Modulation (BICM)-based channel encoding through the convolution encoder 102 and the bit interleaver 104, and then input to the mapper modems 108-1~108-N where an $N^{th}$-order complex symbol vector S shown as Equation 1 below is generated and then input to the precoder 110.

The convolution encoder 102 supports all of N transmit antennas 112-1~112-N. As a result, Blockwise-Uniform Channel Decomposition (BL-UCD) is applied by making a subblock by grouping 2 subchannels of the highest-SNR subchannel and the lowest-SNR subchannel by means of the precoder 110 and a receive filter unit. A detailed description of BL-UCD will be given below.

$$S=[s_1 s_2 \ldots s_N]^T. \quad \text{[Eqn. 1]}$$

The precoder 110 precodes the $N^{th}$-order complex symbol vector s, or an input signal, using an $N \times N_t$ precoder matrix F, thereby outputting an $N_t^{th}$-order complex transmit signal vector x shown as Equation 2:

$$X=[x_1 x_2 \ldots x_{N_t}]^T. \quad \text{[Eqn. 2]}$$

Referring to FIG. 1B, the receiver 120 includes $N_r$ receive antennas 122-1~122-N, a receive filter unit 124, a soft demapper 126, parallel-serial converter 128, a bit deinterleaver 130, and a Viterbi decoder 132.

The $N_r$ receive antennas 122-1~122-N receive an $N_r^{th}$-order complex reception signal vector y shown as Equation 3 below, and transmit it to the receive filter unit 124.

The receive filter unit 124 outputs a signal vector ỹ obtained by performing reception filtering on the y using a receive filter G to which BL-UCD is applied. For each block, the soft demapper 126 independently acquires real parts and imaginary parts of elements constituting the s using the F and the G for the ỹ. Since the remaining structures are not closely related to the present invention, a detailed description thereof will be omitted.

$$y = [y_1 y_2 \ldots y_{N_r}]^T \quad \text{[Eqn. 3]}$$
$$= Hx + w = HFs + w,$$

$$y = [y_1 y_2 \ldots y_{N_r}]^T$$
$$= Hx + w = HFs + w,$$

where H denotes an $N_t \times N_r$ channel matrix.

According to the present invention, a detailed description will now be made of a BL-UCD method to which blockwise ML detection is applied to prevent the error transfer phenomenon.

In order to increase the minimum gain value of each subchannel, the precoder 110 makes subblocks by grouping 2 subchannels of the highest-SNR subchannel and the lowest-SNR subchannel for all subchannels, and then precodes them using the UCD technique.

Specifically, the precoder 110 matches the number N of non-zero singular values to the number K of transmitted streams, and reorders the descending-ordered singular values of a channel matrix H based on the SVD technique, as shown in Equation 4:

$$H = U\Lambda V^\dagger \triangleq [u_1 u_2 \ldots u_K]\Lambda[v_1 v_2 \ldots v_K]^\dagger, \quad \text{[Eqn. 4]}$$

where u and v are each a unitary matrix, and a diagonal matrix $\Lambda$ having a singular value $\lambda_i$ as a diagonal element is $\Lambda = \text{diag}\{\lambda_1, \lambda_N, \lambda_2, \lambda_{N-1}, \ldots, \lambda_{N/2}, \lambda_{N/2+1}\}$. The singular values $\lambda_i$ are numbered according to their sizes ($\lambda_1 \geq \lambda_2 \geq \ldots \geq \lambda_N$).

Thereafter, the precoder 110 in the transmitter 100 precodes output signals of the mapper modems 108-1~108-N using a precoder matrix F defined as Equation 5:

$$F = V\Phi P_{BL}, \quad \text{[Eqn. 5]}$$

where $\Phi$ denotes an N×N diagonal matrix having power loading parameters and is $\text{diag}\{\phi_1, \phi_N, \phi_2, \phi_{N-1}, \ldots, \phi_{N/2}, \phi_{N/2+1}\}$, and $P_{BL}$ denotes a unitary matrix.

The $\Phi$ can be a unit matrix when power loading is not applied, and can be found by the well-known water-filling solution using Equation 6:

$$\phi_k = \left(\mu - \frac{\alpha}{\lambda_k^2}\right)_+^{\frac{1}{2}}, \quad \text{[Eqn. 6]}$$

where $\mu$ is set to satisfy $\Sigma_{k=1}^N \phi_k^2 = N$, $\alpha$ denotes an energy ratio of a transmission symbol to noise, and $$(a)_+ \triangleq \max\{0, a\}.$$

Here, N is found through a BL-UCD process based on Equation 7:

$$P_{BL} \triangleq \text{diag}\{P_1, P_2, \ldots, P_{\frac{N}{2}}\}, \quad \text{[Eqn. 7]}$$

where $P_i$ denotes a preceding matrix of an $i^{th}$ subblock, and $$P_i = \begin{bmatrix} C_i & S_i \\ -S_i & C_i \end{bmatrix} \text{ for } i = 1, 2, \ldots, N/2.$$

Here, $$C_i = \sqrt{\frac{\sqrt{(\sigma_i^2 + \alpha)(\sigma_{N-i+1}^2 + \alpha)} - (\sigma_{N-i+1}^2 + \alpha)}{\sigma_i^2 - \sigma_{N-i+1}^2}} \text{ and}$$

$S_i = \sqrt{1 - C_i^2}$, where $\sigma_i = \lambda_i \phi_i$.

Meanwhile, the receive filter unit 124 in the receiver 120 outputs a signal $\tilde{y}$ obtained by performing reception filtering on an $N_r^{th}$-order complex reception signal vector y of Equation 3, received through the receive antennas 122-1~122-N, using the reordered left singular vectors ($U^\dagger = G$), as shown in Equation 8:

$$\tilde{y} = U^\dagger H F s + U^\dagger w \qquad \text{[Eqn. 8]}$$
$$= \Sigma P_{BL} s + \tilde{w},$$

where an N×N diagonal matrix $$\left(\Sigma \triangleq \Lambda \Phi\right) \text{ is } \text{diag}\{\sigma_1, \sigma_N, \sigma_2, \sigma_{N-1}, \ldots, \sigma_{N/2}, \sigma_{N/2+1}\}.$$

When a total of N effective channel matrixes are blocked (or grouped) two by two, an $i^{th}$ effective channel submatrix $\Sigma_i$ is defined as $$\Sigma_i \triangleq \text{diag}\{\sigma_i, \sigma_{N-i+1}\} \text{ for } i = 1, 2, \ldots, N/2,$$

and $\Sigma$ is expressed as $\Sigma = \text{diag}\{\Sigma_1, \Sigma_2, \ldots, \Sigma_{N/2}\}$. Therefore, the $P_{BL}$ is expressed as Equation 9:

$$P_{BL} \triangleq \text{diag}\{P_1, P_2, \ldots, P_{\frac{N}{2}}\}. \qquad \text{[Eqn. 9]}$$

Figure 2:
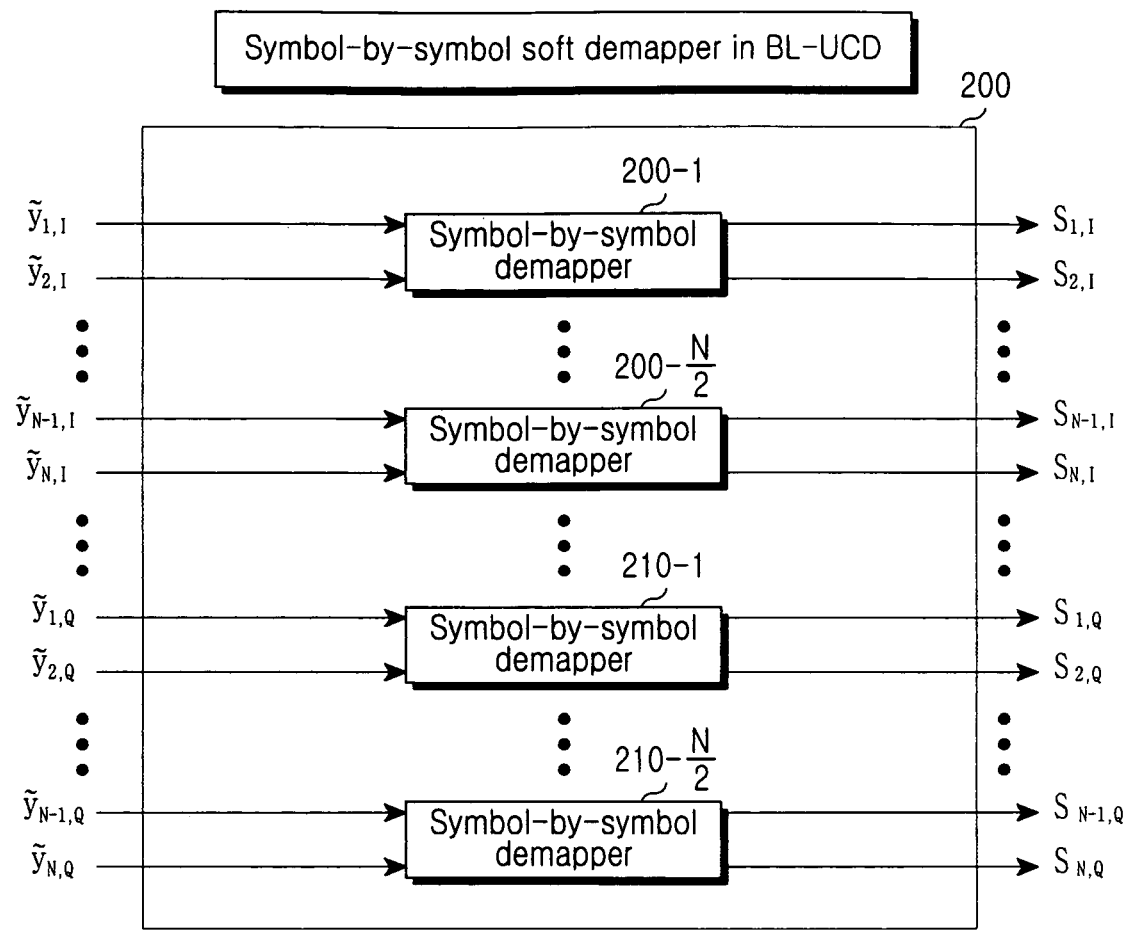
FIG. 2 is a diagram illustrating a structure of a soft demapper according to an embodiment of the present invention.

FIG. 2 is a diagram illustrating a structure of a soft demapper according to an embodiment of the present invention.

Referring to FIG. 2, a soft demapper 200 includes N/2 symbol-by-symbol demappers 200-1~200-N/2 for symbol-by-symbol detection on real signals, and N/2 symbol-by-symbol demappers 210-1~210-N/2 for symbol-by-symbol detection on imaginary signals.

A block diagonal matrix $\Sigma P_{BL}$ obtained by applying the $P_{BL}$ defined in Equation 9 to Equation 8 is as shown in Equation 10:

$$\begin{bmatrix} \tilde{y}_1 \\ \tilde{y}_2 \\ \vdots \\ \tilde{y}_{\frac{N}{2}} \end{bmatrix} = \begin{bmatrix} B_1 & 0 & \cdots & 0 \\ 0 & B_2 & \ddots & \vdots \\ \vdots & \ddots & \ddots & 0 \\ 0 & \cdots & 0 & B_{\frac{N}{2}} \end{bmatrix} \begin{bmatrix} s_1 \\ s_2 \\ \vdots \\ s_{\frac{N}{2}} \end{bmatrix} + \begin{bmatrix} \tilde{w}_1 \\ \tilde{w}_2 \\ \vdots \\ \tilde{w}_{\frac{N}{2}} \end{bmatrix}, \qquad \text{[Eqn. 10]}$$

where $\tilde{y}_i \triangleq [\tilde{y}_{2i-1} \ \tilde{y}_{2i}]^T$, $s_i \triangleq [s_{2i-1} \ s_{2i}]^T$, and $\tilde{w}_i \triangleq [\tilde{w}_{2i-1} \ \tilde{w}_{2i}]^T$.

Further, $B_i$ denotes a 2×2 subblock matrix of an effective channel and is expressed as a matrix ($B_i \triangleq \Sigma_i P_i$) having only the pure real values.

As a result, the $\tilde{y}$ corresponding to an $i^{th}$ subblock is expressed as Equation 11 below for the complex matrix. That is, real parts and imaginary parts of the $\tilde{y}$ are decomposed and input to their associated symbol-by-symbol demappers.

$$\begin{bmatrix} \tilde{y}_{i,I} \\ \tilde{y}_{i,Q} \end{bmatrix} = \begin{bmatrix} B_i & 0 \\ 0 & B_i \end{bmatrix} \begin{bmatrix} s_{i,I} \\ s_{i,Q} \end{bmatrix} + \begin{bmatrix} \tilde{w}_{i,I} \\ \tilde{w}_{i,Q} \end{bmatrix}, \qquad \text{[Eqn. 11]}$$

where the subscripts I and Q denote indicators indicating a real part and an imaginary part of a complex matrix, respectively.

Thereafter, the symbol-by-symbol demappers 200-1~200-N/2 receive 2 consecutive real signals $\tilde{y}_{i,I}$, and output vector signals $\hat{s}_{i,I}$ for the consecutive symbols using the ML equation, or Equation 12 below.

In addition, the N/2 symbol-by-symbol demappers 210-1~210-N/2 receive 2 consecutive imaginary signals $\tilde{y}_{i,Q}$, and output vector signals $\hat{s}_{i,Q}$ for the consecutive symbols using the ML equation, or Equation 13 below. The symbol-by-symbol demappers 200-1~200-N/2 and 210-1~210-N/2 independently detect $s_{i,I}$ and $s_{i,Q}$, respectively.

$$\hat{s}_{i,I} = \arg \min_{s_{i,I} \in \chi^2_{\sqrt{M}}} \|\tilde{y}_{i,I} - B_i s_{i,I}\|^2. \qquad \text{[Eqn. 12]}$$

$$\hat{s}_{i,Q} = \arg \min_{s_{i,Q} \in \chi^2_{\sqrt{M}}} \|\tilde{y}_{i,Q} - B_i s_{i,Q}\|^2. \qquad \text{[Eqn. 13]}$$

In conclusion, in the soft demapper 200, since candidate groups of the transmission signals $\hat{s}_i = \hat{s}_{i,I} + j\tilde{s}_{i,Q}$ for i=1, 2, ..., N/2 acquired through the ML equations of Equation 12 and Equation 13 are equal in number to the constellations of complex symbols used in the transmitter 100, symbol-by-symbol detection is possible.

Figure 3:
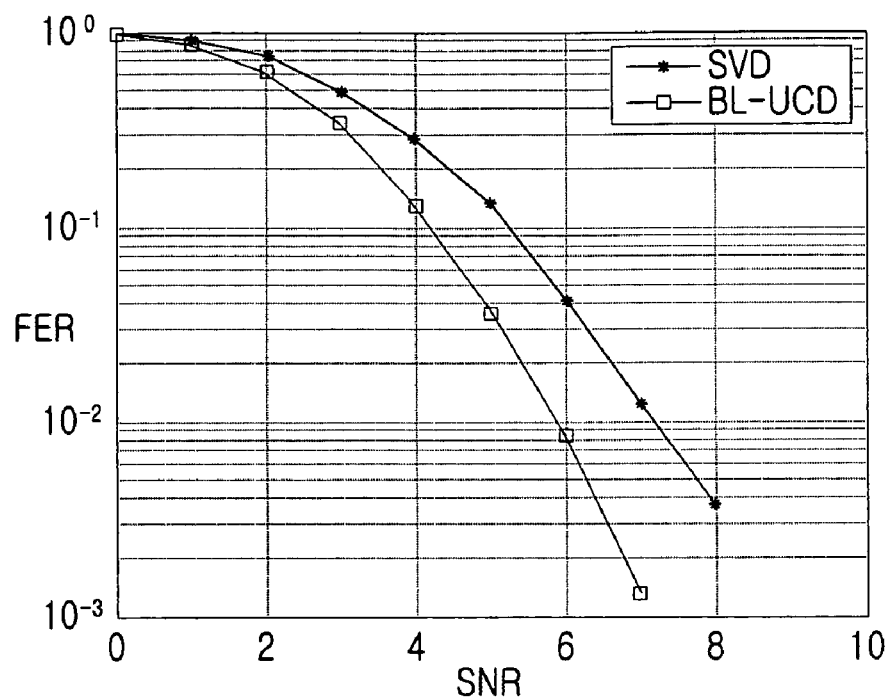
FIG. 3 is a diagram illustrating an example of an error rate versus SNR of BL-UCD according to an embodiment of the present invention.

FIG. 3 is a diagram illustrating an example of an error rate versus SNR of BL-UCD according to an embodiment of the present invention. For example, shown are the simulation results for $N_t=N_r=4$ and data rate=4 bps/Hz.

Referring to FIG. 3, it is shown that compared with SVD, BL-UCD is outstandingly lower in a Frame Error Rate (FER) versus SNR.

Figure 4:
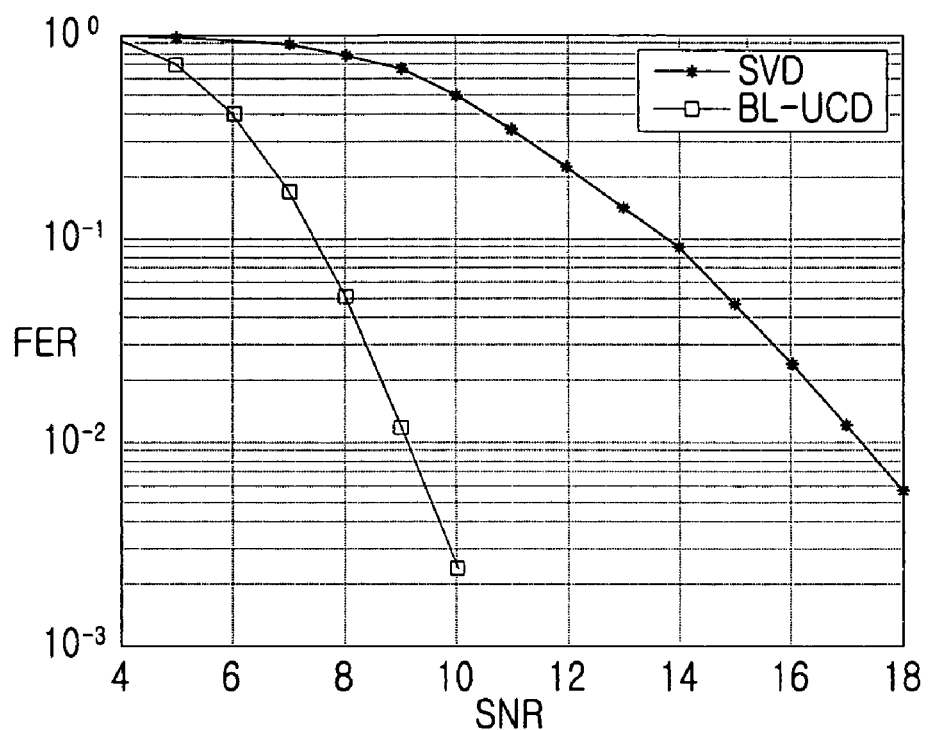
FIG. 4 is a diagram illustrating another example of an error rate versus SNR of BL-UCD according to an embodiment of the present invention.

FIG. 4 is a diagram illustrating another example of an error rate versus SNR of BL-UCD according to an embodiment of the present invention. For example, shown are the simulation results for $N_t=N_r=4$ and data rate=6 bps/Hz.

Referring to FIG. 4, it is shown that compared with SVD, BL-UCD is noticeably lower in FER versus SNR.

As is apparent from the foregoing description, the present invention acquires a blockwise channel structure by applying a precoder to the transmitter and a receive filter to the receiver. Thus, during symbol-by-symbol detection on received symbols, the invention acquires the optimal joint-ML performance without error transfer. Therefore, when channel coding, which is widely used in the actual wireless channel environment, is applied, the proposed technology shows improved error probability performance compared with the existing closed-loop technologies. In addition, since the highest-SNR channel and the lowest-SNR channel are grouped into one subblock, it is possible to reduce an SNR difference between all subchannels, approximately to that of existing UCD technology.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus configured to decompose a channel in a closed-loop Multiple Input Multiple Output (MIMO) communication system, the apparatus comprising:
a transmitter configured to:
group subchannels of the channel into input symbols in which each input symbol comprises a subchannel with a high signal to noise ratio (SNR) and another subchannel with a low SNR; and
precode the input symbols using a first matrix which is a product of a unitary matrix V, a diagonal matrix $\Phi$ and a blockwise Uniform Channel Decomposition (UCD) matrix $P_{BL}$, before outputting the input symbols,
wherein the diagonal matrix $\Phi$ comprises a unit matrix when a power loading is not applied.

2. The apparatus of claim 1, wherein the diagonal matrix $\Phi$ comprises an N×N diagonal matrix,
wherein elements $\phi_k$ of the diagonal matrix $\Phi$ are calculated using a water-filling scheme, the diagonal matrix $\Phi$ and its elements $\phi_k$ are expressed as:

$$\Phi \triangleq \text{diag}\{\phi_1, \phi_N, \phi_2, \phi_{N-1}, \ldots, \phi_{N/2}, \phi_{N/2+1}\},$$

$$\phi_k = \left(\mu - \frac{\alpha}{\lambda_k^2}\right)_+^{\frac{1}{2}} \text{ for } k = 1, 2, \ldots, N,$$

where $\mu$ comprises a parameter for satisfying a condition of $$\sum_{k=1}^{N} \phi_k^2 = N,$$

$\alpha$ denotes an energy ratio of a transmission symbol to noise, $$(\alpha)_+ \triangleq \max\{0, \alpha\},$$

$\lambda_k$ comprises a diagonal element of a diagonal matrix $\Lambda$, and $\Lambda = \text{diag}\{\lambda_1, \lambda_N, \lambda_2, \lambda_{N-1}, \ldots, \lambda_{N/2}, \lambda_{N/2+1}\}$.

3. The apparatus of claim 2, wherein an element $P_i$ of the matrix $P_{BL}$ is expressed as:

$$P_{BL} \triangleq \text{diag}\left\{P_1, P_2, \ldots, P_{\frac{N}{2}}\right\},$$

where $$P_i = \begin{bmatrix} C_i & S_i \\ -S_i & C_i \end{bmatrix} \text{ for } i = 1, 2, \ldots, N/2,$$

in which $$C_i = \sqrt{\frac{\sqrt{(\sigma_i^2 + \alpha)(\sigma_{N-i+1}^2 + \alpha)} - (\sigma_{N-i+1}^2 + \alpha)}{\sigma_i^2 - \sigma_{N-i+1}^2}} \text{ and}$$

$S_i = \sqrt{1 - C_i^2}$, where $\sigma_i = \lambda_i \phi_i$.

4. The apparatus of claim 1, further comprising:
a receiver configured to generate a reception signal vector by filtering an output signal of the transmitter using a second matrix.

5. The apparatus of claim 4, wherein the second matrix comprises a matrix $U^\dagger$ obtained by performing conjugate transpose on a singular vector unitary matrix U including a channel matrix H,
wherein the channel matrix H is expressed as:

$$H = U\Lambda V^\dagger \triangleq [u_1 u_2 \ldots u_k]\Lambda[v_1 v_2 \ldots v_K]^\dagger,$$

where H denotes a channel matrix acquired using a Singular Value Decomposition (SVD) technique, and V denotes a singular value matrix.

6. The apparatus of claim 5, wherein the reception signal vector $\tilde{y}$ is expressed as:

$$\tilde{y} = U^\dagger H F_s + U^\dagger w$$
$$= \Sigma P_{BL} s + \tilde{w}$$

$$\begin{bmatrix} \tilde{y}_1 \\ \tilde{y}_2 \\ \vdots \\ \tilde{y}_{\frac{N}{2}} \end{bmatrix} = \begin{bmatrix} B_1 & 0 & \ldots & 0 \\ 0 & B_2 & \ddots & \vdots \\ \vdots & \ddots & \ddots & 0 \\ 0 & \ldots & 0 & B_{\frac{N}{2}} \end{bmatrix} \begin{bmatrix} s_1 \\ s_2 \\ \vdots \\ s_{\frac{N}{2}} \end{bmatrix} + \begin{bmatrix} \tilde{w}_1 \\ \tilde{w}_2 \\ \vdots \\ \tilde{w}_{\frac{N}{2}} \end{bmatrix},$$

where $$\tilde{y}_i \triangleq [\tilde{y}_{2i-1} \ \tilde{y}_{2i}]^T, s_i \triangleq [s_{2i-1} \ s_{2i}]^T, \tilde{w}_i \triangleq [\tilde{w}_{2i-1} \ \tilde{w}_{2i}]^T,$$

and $B_i$ denotes a 2×2 subblock matrix of an effective channel and is expressed as a matrix $$(B_i \triangleq \Sigma_i P_i)$$

having only pure real values.

7. A method for decomposing a channel in a closed-loop Multiple Input Multiple Output (MIMO) communication system, the method comprising:
grouping subchannels of the channel into input symbols in which each input symbol comprises a subchannel with a high signal to noise ratio (SNR) and another subchannel with a low SNR; and
precoding the input symbols using a first matrix which comprises a product of a unitary matrix V, a diagonal matrix $\Phi$ and a blockwise Uniform Channel Decomposition (UCD) matrix $P_{BL}$, before outputting the input symbols,
wherein the diagonal matrix $\Phi$ comprises a unit matrix when a power loading is not applied.

8. The method of claim 7, wherein the diagonal matrix $\Phi$ comprises an N×N diagonal matrix;
wherein elements $\phi_k$ of the diagonal matrix $\Phi$ are calculated using a water-filling scheme, the diagonal matrix $\Phi$ and elements $\phi_k$ expressed as:

$$\Phi \triangleq \text{diag}\{\phi_1, \phi_N, \phi_2, \phi_{N-1}, \ldots, \phi_{N/2}, \phi_{N/2+1}\},$$

$$\phi_k = \left(\mu - \frac{\alpha}{\lambda_k^2}\right)_+^{\frac{1}{2}} \text{ for } k = 1, 2, \ldots, N,$$

where $\mu$ is a parameter for satisfying a condition of $$\sum_{k=1}^{N} \phi_k^2 = N,$$

$\alpha$ denotes an energy ratio of a transmission symbol to noise, $$(\alpha)_+ \triangleq \max\{0, \alpha\},$$

$\lambda_k$ comprises a diagonal element of a diagonal matrix $\Lambda$, and $\Lambda = \text{diag}\{\lambda_1, \lambda_N, \lambda_2, \lambda_{N-1}, \ldots, \lambda_{N/2}, \lambda_{N/2+1}\}$.

9. The method of claim 8, wherein an element $P_i$ of the matrix $P_{BL}$ is expressed as:

$$P_{BL} \triangleq \text{diag}\{P_1, P_2, \ldots, P_{\frac{N}{2}}\},$$

where $$P_i = \begin{bmatrix} C_i & S_i \\ -S_i & C_i \end{bmatrix} \text{ for } i = 1, 2, \ldots, N/2,$$

in which $$C_i = \sqrt{\frac{\sqrt{(\sigma_i^2 + \alpha)(\sigma_{N-i+1}^2 + \alpha)} - (\sigma_{N-i+1}^2 + \alpha)}{\sigma_i^2 - \sigma_{N-i+1}^2}} \text{ and}$$

$$S_i = \sqrt{1 - C_i^2}, \text{ where } \sigma_i = \lambda_i \phi_i.$$

10. The method of claim 7, further comprising:
generating a reception signal vector by filtering the precoded input symbols.

11. The method of claim 10, wherein the second matrix comprises a matrix $U^\dagger$ obtained by performing conjugate transpose on a singular vector unitary matrix U including a channel matrix H, the H expressed as:

$$H = U\Lambda V^\dagger \triangleq [u_1 u_2 \ldots u_K]\Lambda[v_1 v_2 \ldots v_K]^\dagger,$$

where H denotes a channel matrix acquired using a Singular Value Decomposition (SVD) technique, and V denotes a singular value matrix.

12. The method of claim 11, wherein the reception signal vector $\tilde{y}$ is expressed as v:

$$\tilde{y} = U^\dagger HF_s + U^\dagger w$$
$$= \Sigma P_{BL} s + \tilde{w}$$

$$\begin{bmatrix} \tilde{y}_1 \\ \tilde{y}_2 \\ \vdots \\ \tilde{y}_{\frac{N}{2}} \end{bmatrix} = \begin{bmatrix} B_1 & 0 & \ldots & 0 \\ 0 & B_2 & \ddots & \vdots \\ \vdots & \ddots & \ddots & 0 \\ 0 & \ldots & 0 & B_{\frac{N}{2}} \end{bmatrix} \begin{bmatrix} s_1 \\ s_2 \\ \vdots \\ s_{\frac{N}{2}} \end{bmatrix} + \begin{bmatrix} \tilde{w}_1 \\ \tilde{w}_2 \\ \vdots \\ \tilde{w}_{\frac{N}{2}} \end{bmatrix},$$

where $$\tilde{y}_i \triangleq [\tilde{y}_{2i-1} \quad \tilde{y}_{2i}]^T, s_i \triangleq [s_{2i-1} \quad s_{2i}]^T, \tilde{w}_i \triangleq [\tilde{w}_{2i-1} \quad \tilde{w}_{2i}]^T,$$

and $B_i$ denotes a 2×2 subblock matrix of an effective channel and is expressed as a matrix $$(B_i \triangleq \Sigma_i P_i)$$

having only pure real values.

13. An apparatus configured to decompose a channel in a closed-loop Multiple Input Multiple Output (MIMO) communication system, the apparatus comprising:
a receiver configured to:
receive an output signal from a transmitter, the output signal generated by precoding input symbols using a first matrix which comprises a product of a unitary matrix V, a diagonal matrix $\Phi$ and a blockwise Uniform Channel Decomposition (UCD) matrix $P_{BL}$, each input symbol comprising a subchannel of the channel having a high signal to noise ratio (SNR) and another subchannel of the channel having a low SNR; and
generate a reception signal vector according to the received output signal,
wherein the diagonal matrix $\Phi$ comprises a unit matrix when a power loading is not applied.

14. The apparatus of claim 13, wherein the diagonal matrix $\Phi$ comprises an N×N diagonal matrix;
wherein elements $\phi_k$ of the diagonal matrix $\Phi$ are calculated using a water-filling scheme, the diagonal matrix $\Phi$ and the elements $\phi_k$ expressed as:

$$\Phi \triangleq \text{diag}\{\phi_1, \phi_N, \phi_2, \phi_{N-1}, \ldots, \phi_{N/2}, \phi_{N/2+1}\},$$

$$\phi_k = \left(\mu - \frac{\alpha}{\lambda_k^2}\right)_+^{\frac{1}{2}} \text{ for } k = 1, 2, \ldots, N,$$

where $\mu$ is a parameter for satisfying a condition of $$\sum_{k=1}^{N} \phi_k^2 = N,$$

$\alpha$ denotes an energy ratio of a transmission symbol to noise, $$(a)_+ \triangleq \max\{0, a\},$$

$\lambda_k$ is a diagonal element of a diagonal matrix $\Lambda$, and $\Lambda = \text{diag}\{\lambda_1, \lambda_N, \lambda_2, \lambda_{N-1}, \ldots, \lambda_{N/2}, \lambda_{N/2+1}\}$.

15. The apparatus of claim 13, wherein the receiver is configured to generate the reception signal by filtering the output signal of the transmitter using a second matrix.

16. The apparatus of claim 15, wherein the second matrix is a matrix $U^\dagger$ obtained by performing conjugate transpose on a singular vector unitary matrix U including a channel matrix H, the matrix H expressed as:

$$H = U\Lambda V^\dagger \triangleq [u_1 u_2 \ldots u_K]\Lambda[v_1 v_2 \ldots v_K]^\dagger,$$

where H denotes a channel matrix acquired using a Singular Value Decomposition (SVD) technique, and V denotes a singular value matrix.

17. The apparatus of claim 16, wherein the reception signal vector $\tilde{y}$ is expressed as:

$$\tilde{y} = U^\dagger HFs + U^\dagger w$$
$$= \sum P_{BL} s + \tilde{w}$$

$$\begin{bmatrix} \tilde{y}_1 \\ \tilde{y}_2 \\ \vdots \\ \tilde{y}_{\frac{N}{2}} \end{bmatrix} = \begin{bmatrix} B_1 & 0 & \ldots & 0 \\ 0 & B_2 & \ddots & \vdots \\ \vdots & \ddots & \ddots & 0 \\ 0 & \ldots & 0 & B_{\frac{N}{2}} \end{bmatrix} \begin{bmatrix} s_1 \\ s_2 \\ \vdots \\ s_{\frac{N}{2}} \end{bmatrix} + \begin{bmatrix} \tilde{w}_1 \\ \tilde{w}_2 \\ \vdots \\ \tilde{w}_{\frac{N}{2}} \end{bmatrix},$$

where $\tilde{y}_i \triangleq [\tilde{y}_{2i-1} \quad \tilde{y}_{2i}]^T, s_i \triangleq [s_{2i-1} \quad s_{2i}]^T, \tilde{w}_i \triangleq [\tilde{w}_{2i-1} \quad \tilde{w}_{2i}]^T,$ and $B_i$ denotes a 2×2 subblock matrix of an effective channel and is expressed as a matrix $$\left(B_i \triangleq \sum_i P_i\right)$$

having only pure real values.

\* \* \* \* \*